No. 754,746. PATENTED MAR. 15, 1904.
W. S. CLARKSON.
EXHAUST NOZZLE.
APPLICATION FILED DEC. 26, 1903.
NO MODEL. 3 SHEETS—SHEET 1.

WITNESSES:
H. Walker
Isaac B. Owens

INVENTOR
William S. Clarkson
BY
[signature]
ATTORNEYS

No. 754,746. PATENTED MAR. 15, 1904.
W. S. CLARKSON.
EXHAUST NOZZLE.
APPLICATION FILED DEC. 26, 1903.
NO MODEL. 3 SHEETS—SHEET 2.
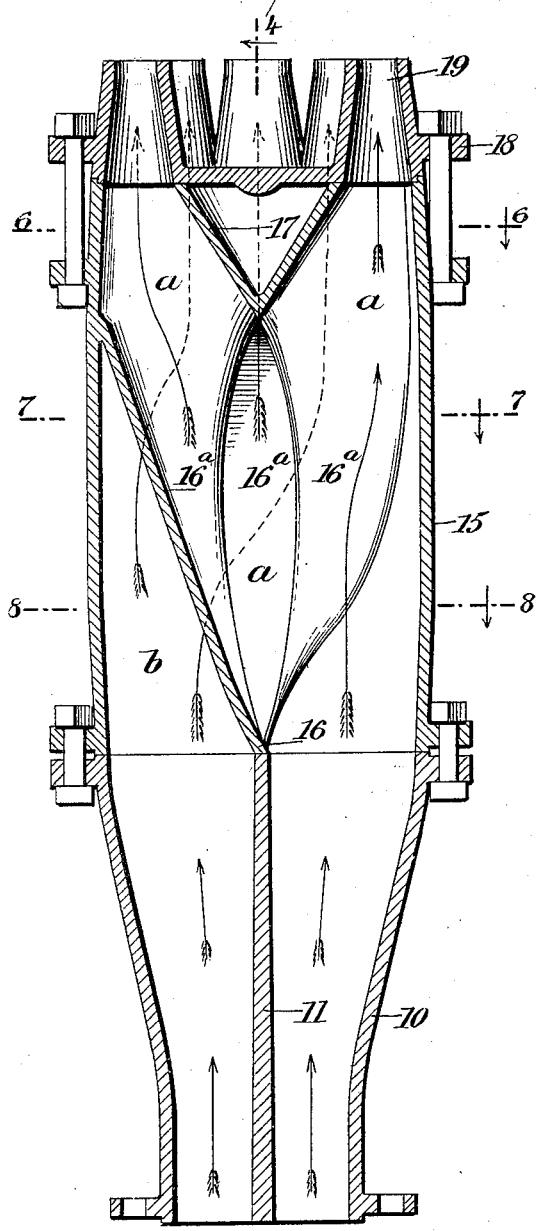
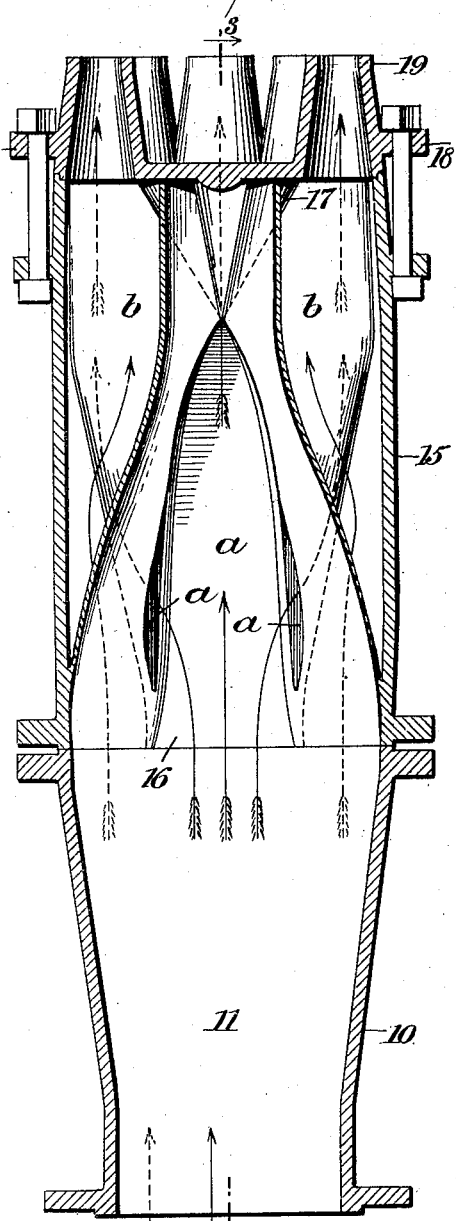
WITNESSES:
H. Walker
Isaac B. Owens.
INVENTOR
William S. Clarkson
BY
ATTORNEYS No. 754,746. PATENTED MAR. 15, 1904.
W. S. CLARKSON.
EXHAUST NOZZLE.
APPLICATION FILED DEC. 26, 1903.
NO MODEL. 3 SHEETS—SHEET 3.

WITNESSES:
H. Walker
Isaac B. Owens

INVENTOR
William S. Clarkson
BY
ATTORNEYS

No. 754,746. Patented March 15, 1904.

UNITED STATES PATENT OFFICE.

WILLIAM S. CLARKSON, OF LIVINGSTON, MONTANA.

EXHAUST-NOZZLE.

SPECIFICATION forming part of Letters Patent No. 754,746, dated March 15, 1904.

Application filed December 26, 1903. Serial No. 186,617. (No model.)

*To all whom it may concern:*

Be it known that I, WILLIAM S. CLARKSON, a citizen of the United States, and a resident of Livingston, in the county of Park and State of Montana, have invented a new and Improved Exhaust-Nozzle, of which the following is a full, clear, and exact description.

This invention relates to an exhaust-nozzle intended particularly for duplex engines where the exhaust-steam is used for creating a draft through the fire—such, for example, as is to be found in ordinary locomotive practice, in which case the exhaust-nozzle lies in the smoke-box of the locomotive.

The prime object of the invention is to keep the exhaust from each side of the engine independent, so that the exhaust from one engine will not tend to create a back pressure on the other engine and to cause the exhaust-steam to be equally distributed through the smoke-stack, thus bringing about an even and uniform draft therein.

Other features are involved, and all will be fully set forth hereinafter.

This specification is an exact description of one example of my invention, while the claims define the actual scope thereof.

Reference is to be had to the accompanying drawings, forming a part of this specification, in which similar characters of reference indicate corresponding parts in all the views.

Figure 1:
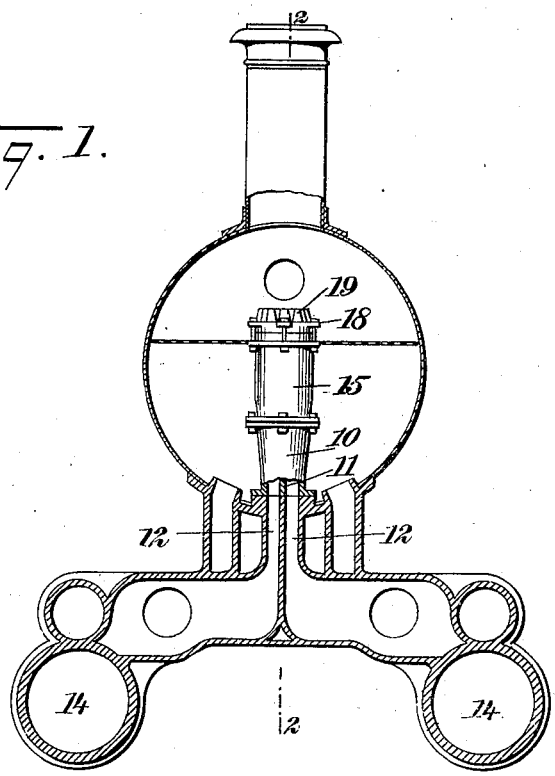
Figure 2:
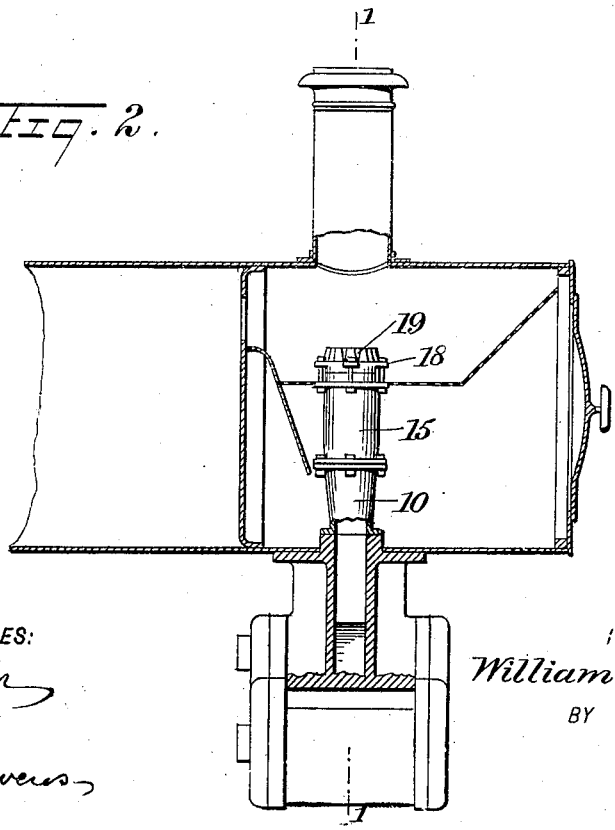
Figure 5:
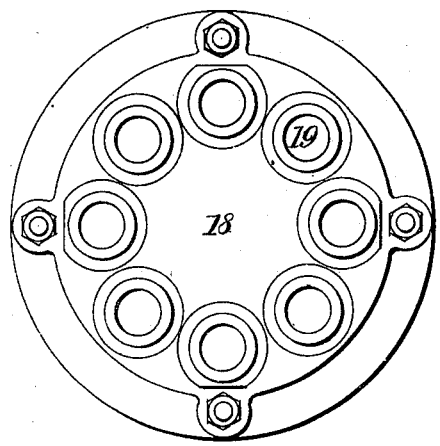
Figure 6:
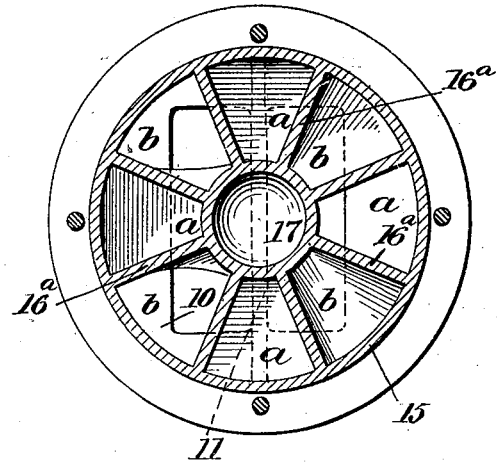
Figure 7:
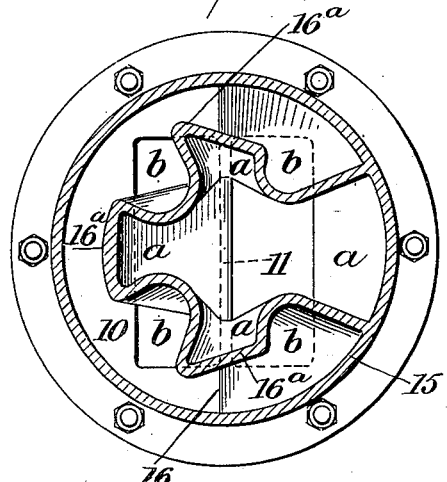
Figure 8:
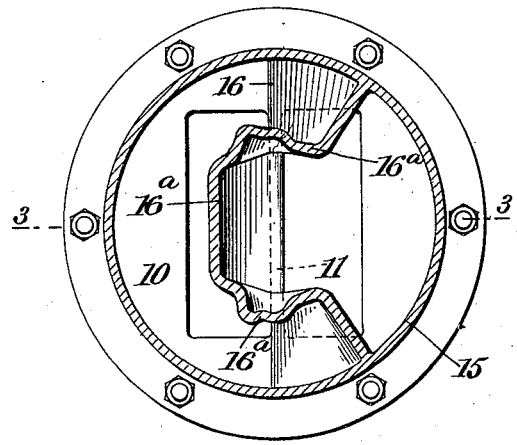
Figure 9:
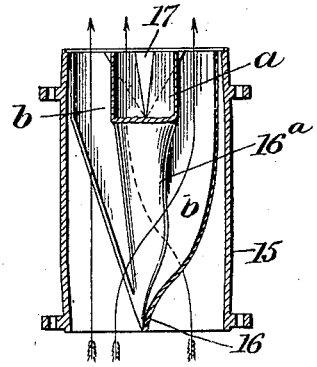

Figure 1 is a sectional elevation on the line 1 1 of Fig. 2, showing the locomotive-cylinders and fire-box with the improved exhaust-nozzle applied thereto. Fig. 2 is a longitudinal section on the line 2 2 of Fig. 1. Fig. 3 is an enlarged vertical section of the exhaust-nozzle on the lines 3 3 of Figs. 4 and 8. Fig. 4 is an enlarged vertical section of the outer walls or shell of the nozzle and of the tip on the line 4 4 of Fig. 3, said view showing, however, the walls of the passages within the nozzle-shell in elevation except where they are broken away from the said outer shell or wall of the nozzle. Fig. 5 is a plan view of the tip of the nozzle. Figs. 6, 7, and 8 are respectively cross-sections on the lines 6 6, 7 7, and 8 8 of Fig. 3; and Fig. 9 is a reduced view of the body of the nozzle, showing the outer walls or shells in longitudinal section, but illustrating the walls of the steam-passages therein in elevation except where they are broken away from the exterior wall or shell, this view looking at the said walls of the steam-passages on a line at right angles to the line of vision in Fig. 4.

10 indicates the base of the nozzle, which is in the form of a pipe and which has a central longitudinal partition therein, said base being bolted or otherwise fastened in the bottom of the smoke-box and its two passages formed by the partition 11, communicating, respectively, with the exhaust-passages 12 from the engine-cylinders 14.

The body of the nozzle comprises an exterior tubular shell 15, suitably fastened on the base-section 10. Within said body-section 15 is arranged a partition dividing said body into two groups of longitudinally-extending steam-passages. Said partition starts at its bottom edge with a straight transverse portion 16, registering with the partition 11 of the base 10, from which point said partition extends upward, rounding into essentially circular form, and is constructed with undulations $16^a$, gradually increasing in area or size from the bottom to the top and forming by this gradual increase distinct passages at the top of the body, one group of which passages communicates with one side of the partition 11 and the other group of which passages communicates with the other side. Figs. 3, 4, and 9 show the course of this peculiarly-formed partition in elevation, while Figs. 6, 7, and 8 show horizontal sections thereof. Fig. 8 shows the undulations $16^a$ at the lower part of the partition, where said undulations are relatively slight. Fig. 7 shows the undulations as they increase in depth and sharpness, and in this view it will be seen that the distinct passages begin to take their form. In said view the letter *a* indicates the four passages formed by the undulations, these passages each communicating with the right-hand side of the partition 11, (see also Fig. 3,) and the letter *b* in Fig. 7 indicates the four passages at the opposite side of the partition, which communicate with the left-hand side of the partition 11. (See also Fig. 3.) Fig. 6 shows said partition at its upper extremity, where the undulations attain their greatest depth and where the passages are distinct and separate. In this view the letters $a$ indicate the four passages at the right-hand side of the partition 11, (see Fig. 3,) and the letter $b$ indicates the four passages at the left-hand side of said partition. It will be observed particularly from Fig. 6 that the said passages $a$ and $b$ alternate, and in this manner the exhaust-steam (no matter from which side of the partition 11 it proceeds) is discharged uniformly from the upper extremity of the body-section 15 of the nozzle.

17 indicates a conical spreader which is formed in the center of the upper extremity of the body of the nozzle, this spreader separating from each other the upper portions of the four passages $a$ and forming an inner wall for the upper extremities of all of the passages $a$ and $b$. It will therefore be seen that by means of the above-described structure the exhaust from one side of the engine is kept separate from the other, so that there is no danger of the back pressure referred to, and, further, by means of the peculiar structure within the body-section of the nozzle the exhaust-steam is discharged equally and uniformly from the upper end of the said body-section.

The tip of the nozzle resembles somewhat the structure shown in my prior patent, No. 733,154, dated July 7, 1903, and comprises a plate 18, suitably fastened to the body 15 and bearing on the upper extremity of the shell thereof and on the upper edge of the conical spreader 17. Said plate 18 is provided with a number of nipples 19, respectively communicating with the passages $a$ and $b$. The result of this is that each of said passages leads to its separate nipple, and the puff of exhaust-steam from one cylinder is discharged from alternate of said nipples, and the puff of exhaust-steam from the other cylinder is discharged from the alternating remaining nipples.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. An exhaust-nozzle, comprising a tubular outer shell or wall, and interior walls forming two distinct passages through the nozzle, for the purpose specified, said passages being arranged at the discharge end of the nozzle to discharge the steam with a uniform distribution around the sides of the nozzle.

2. An exhaust-nozzle, comprising a tubular outer shell or wall, and interior walls forming two groups of passages, for the purpose specified, the members of one group of passages alternating with the members of the other group of passages at the discharge end of the nozzle, uniformly to distribute the exhaust-steam from each group of passages.

3. An exhaust-nozzle, comprising a tubular exterior wall or shell, and an interior partition extending longitudinally therein, said partition dividing the shell into two passages at one end of the partition and the partition rounding and undulating from said end to the opposite end, there to form two groups of passages, one group at one side of the partition and the other group at the other side of the partition, the members of one group of passages alternating with the members of the other group of passages at the discharge end of the nozzle, whereby equally to distribute the exhaust-steam.

4. An exhaust-nozzle, comprising a tubular exterior wall or shell, an interior partition extending longitudinally therein, said partition dividing the shell into two sides at one end of the partition and the partition rounding and undulating from said end to the opposite end, there to form two groups of passages, one group at one side of the partition and the other group at the other side of the partition, the members of one group of passages alternating with the members of the other group of passages at the discharge end of the nozzle, whereby equally to distribute the exhaust-steam, and a conical spreader located centrally in the discharge end of the nozzle.

5. An exhaust-nozzle, comprising a tubular base portion having a longitudinal partition therein, and a body portion communicating with the base portion and comprising tubular exterior walls and an interior wall forming two passages within the body, said passages communicating respectively with the sides of the partition in the base.

6. A nozzle, comprising a tubular base-section having a longitudinally-extending partition therein, and a body-section communicating with the base-section and comprising a tubular outer wall or shell and interior walls forming two groups of longitudinally-extending passages, said groups of passages respectively communicating with the base-section of the nozzle at the opposite side of the partition therein.

7. A nozzle, comprising a tubular base-section having a longitudinally-extending partition therein, and a body-section communicating with the base-section and comprising a tubular outer wall or shell and interior walls forming two groups of longitudinally-extending passages, said groups of passages respectively communicating with the base-section of the nozzle at the opposite side of the partition therein, and the interior walls of the body-section being arranged to alternate the members of one group of passages with the members of the other group of passages at the discharge end of the body-section.

8. A nozzle, comprising a base-section having two passages therein, a body-section communicating with the base-section and having walls forming two groups of passages, said groups respectively communicating with the passages of the base-section, and a tip communicating with the body-section and having opening nipples respectively communicating with the passages of the body-section.

9. An exhaust-nozzle, comprising a tubular exterior wall or shell, and an interior partition extending longitudinally therein, said partition dividing the shell into two passages at one end of the partition and the partition rounding and undulating from said end to the opposite end there to form two groups of passages, one group at one side of the partition and the other group at the other side of the partition, the members of one group of passages alternating with the members of the other group of passages at the discharge end of the nozzle, whereby equally to distribute the exhaust-steam, and a tip mounted on said exterior wall or shell and having nipples respectively communicating with the said passages.

10. An exhaust-nozzle, comprising a tubular outer shell or wall, and interior walls forming two distinct passages through the nozzle, for the purpose specified, said passages being arranged at the discharge end of the nozzle to discharge the steam with a uniform distribution around the sides of the nozzle, and a tip mounted on the said wall or shell and having nipples respectively communicating with the said passages.

11. An exhaust-nozzle, comprising a tubular outer shell or wall, and interior walls forming two groups of passages, for the purpose specified, the members of one group of passages alternating with the members of the other group of passages at the discharge end of the nozzle, uniformly to distribute the exhaust-steam from each group of passages, and a tip having a circular row of nipples respectively communicating with said passages.

12. An exhaust-nozzle having a plurality of steam-passages running through it, and a tip mounted on the nozzle and having circular series of nipples constituting nozzles proper and respectively communicating with the said passages.

In testimony whereof I have signed my name to this specification in the presence of two subscribing witnesses.

WILLIAM S. CLARKSON.

Witnesses:
J. C. VILAS,
W. H. BOWEN.